Sept. 3, 1968  G. J. SCHROER  3,399,654

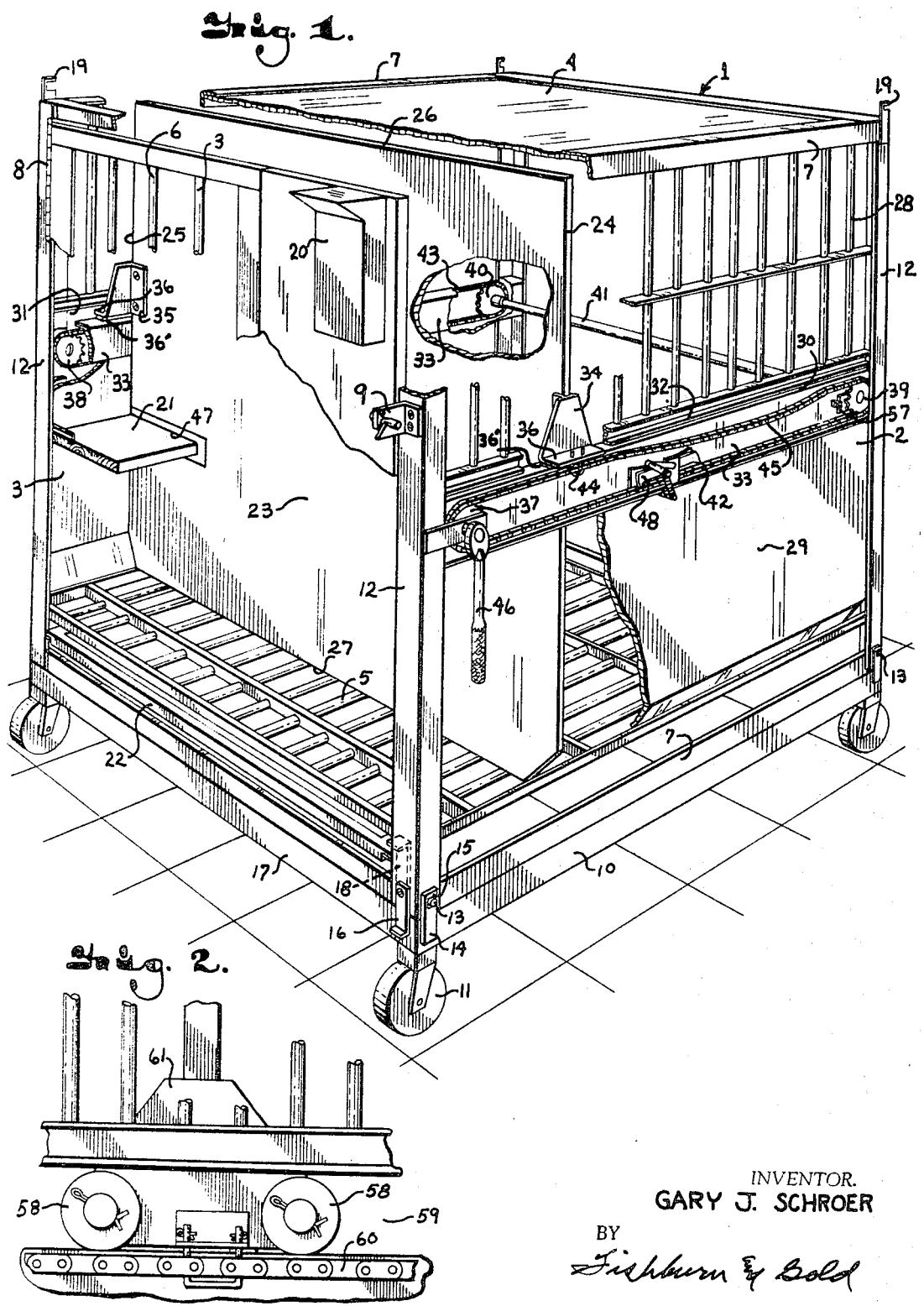

ANIMAL RESTRAINING CAGE

Filed Oct. 24, 1966  3 Sheets-Sheet 2

INVENTOR.
GARY J. SCHROER
BY
Fishburn & Gold
ATTORNEYS

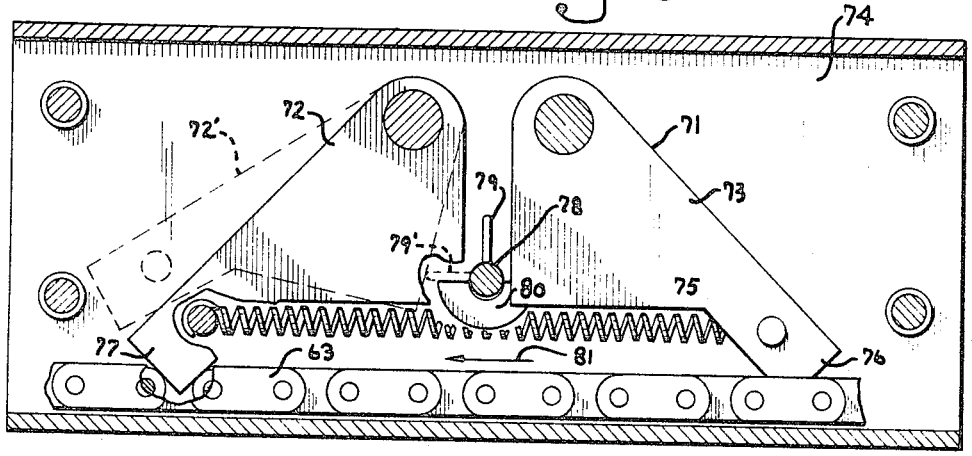
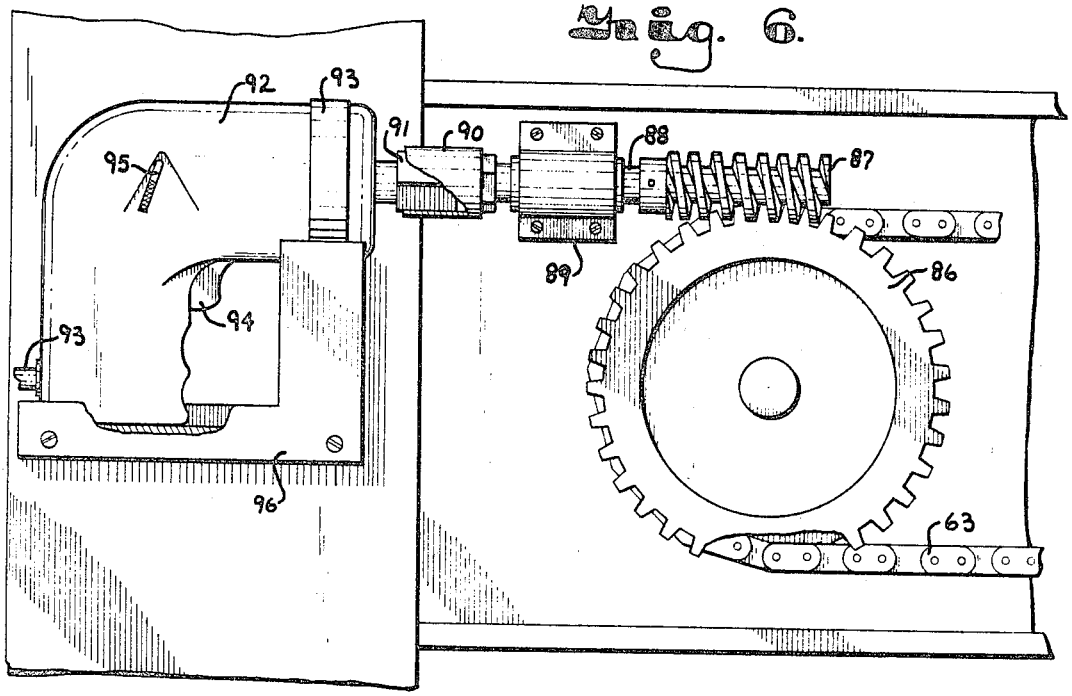
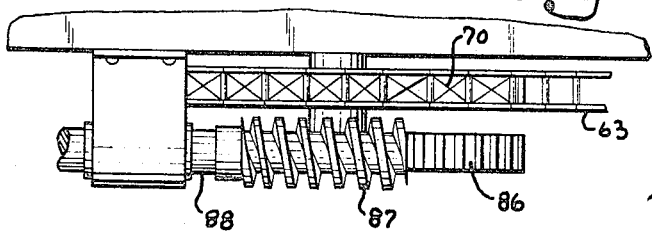
INVENTOR.
GARY J. SCHROER
BY
Fishburn and Gold
ATTORNEYS United States Patent Office 3,399,654
Patented Sept. 3, 1968

3,399,654
ANIMAL RESTRAINING CAGE
Gary J. Schroer, Kansas City, Mo., assignor to Schroer Manufacturing Company, Inc., Kansas City, Mo., a corporation of Missouri
Filed Oct. 24, 1966, Ser. No. 588,848
16 Claims. (Cl. 119—96)

This invention relates to animal restraining apparatus and, more particularly, to movable wall cages adapted to selectively restrain relatively large animals for laboratory studies.

Larger laboratory animals, such as certain primates, may be very difficult to restrain during laboratory procedures due to their size and considerable strength. Known restraining apparatus of the movable wall type useful with small laboratory animals, such as rats, are impractical with larger animals because of excessive size, poor control, inadequate leverage for one-man operation and/or poor visibility of the animal by the operator.

The principal objects of the present invention are: to provide an animal cage, suitable for containing larger laboratory animals, which has a restraining wall mounted in a novel manner for movement toward one end of the cage to restrain the animal for laboratory procedures; to provide such a cage wherein the restraining wall is mounted on simple structure and includes highly effective translating mechanisms for moving the restraining wall within the cage; to provide such translating mechanism which produces a positive synchronization of movement within the cage between the side edges of the restraining wall; to provide such a restraining cage which provides an elevated platform within the cage for the animal which does not interfere with movement of the restraining wall; to provide such apparatus which automatically locks the restraining wall in position so as to safely confine the animal without attention to the translating mechanism; and to provide such apparatus which is rugged in construction, easily used by relatively inexperienced personnel and well adapted for its intended purpose.

Other objects and advantages of this invention will become apparent from the following description taken in connection with the accompanying drawings wherein are set forth by way of illustration and examples certain embodiments of this invention.

FIG. 1 is a perspective view of a movable wall animal cage embodying this invention with portions broken away to show certain novel structural and operating parts.

FIG. 2 is a fragmentary side elevation on an enlarged scale illustrating an alternative form of wall support from that of FIG. 1.

FIG. 5 is a fragmentary cross-sectional side elevation on an enlarged scale showing details of a modified ratchet mechanism for automatically locking the restraining wall in a desired position.

FIG. 6 is a fragmentary side elevation on an enlarged scale showing a modified cage structure having power driven mechanism for moving the restraining wall.

FIG. 7 is a fragmentary top view of the structure of FIG. 6.

Figure 3:
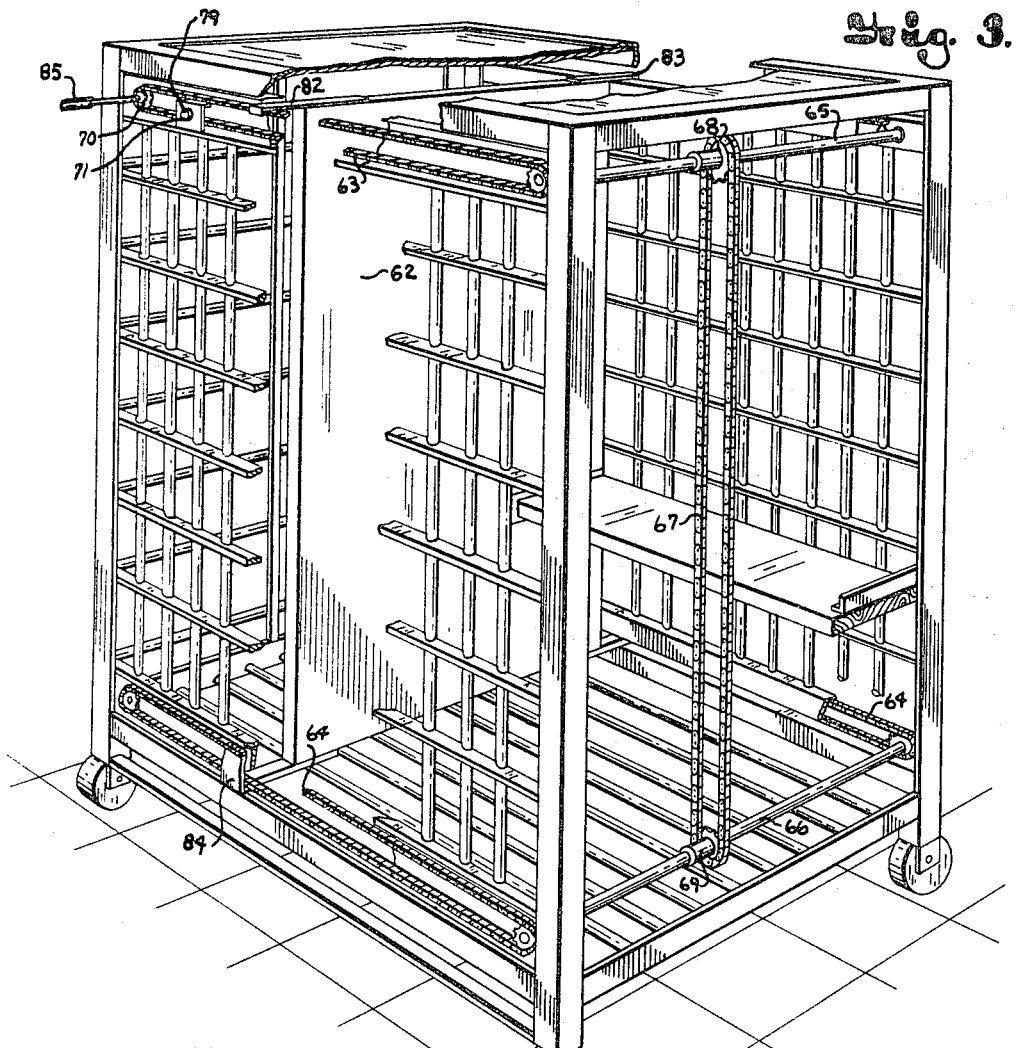
FIG. 3 is a perspective view of a modified cage embodying this invention which provides movable wall supports at the upper and lower corners thereof.

Referring to the drawings in more detail:

The reference numeral 1 generally indicates an animal restraining cage embodying this invention. In this example the cage 1 is rectangular and has a pair of spaced apart parallel side walls 2 and 3, spaced apart parallel top and bottom walls 4 and 5 and a front end wall 6. The side, top and bottom walls are secured in rigid relation with respect to each other by suitable structural members, in this example, elongated angles 7 so as to form a box-like construction. The front end wall 6 is secured to the structure along one edge by means of an elongated hinge 8 thus forming a door which can be opened to provide access into the cage 1. A suitable latch 9 is provided at an edge opposed from the hinge 8 for selectively locking the door in closed position. The walls 2–6 may be made entirely or partially of spaced apart bars as desired so as to confine an animal therein and still permit observation and access without opening the cage door.

The cage 1 rests upon a platform 10 having suitable wheels 11 depending therefrom so as to permit the cage to be moved about as desired. Vertical structural members 12 are provided at each corner of the cage and respectively have pins 13 projecting laterally outwardly therefrom in parallel relation near the bottom. The pins 13 are respectively received in hook-like retainers 14 rigidly secured to the corners of the platform 10 and extending upwardly therefrom. The retainers 14 have rearwardly open slots 15 extending thereinto and which receive the respective pins 13 when the cage is moved forwardly onto the platform 10. The retainers 14 thereby anchor the bottom corners of the cage to prevent accidental upward disengagement between the supporting platform 10 and the cage during movement or violent actions by the caged animal. A latch bar 16 is pivotally mounted at a lower front corner of the cage 1 and is pivotable into engagement with the front structural member 17 of the platform from a position indicated by the broken lines at 18. When engaging the member 17, the latch bar 16 prevents the rearward movement of the cage 1 with respect to the platform 10 and also prevents the respective pins 13 from becoming disengaged from the slots 15. When it is desired to remove the cage from the platform, it is only necessary to pivot the latch bar 16 to the position shown by the broken lines 18 whereupon a relative sliding movement between the cage and platform may be effected permitting disengagement. In this example the upper corners of the cage 1 have retainers 19 extending upwardly therefrom which are similar to the retainers 14; thus, if desired, an additional cage similar to the cage 1 may be locked in position thereover resulting in a two story cage supported on the platform 10.

The front end wall 6, if desired, may include suitable conventional watering and feeding devices 20 to which the animal has access from within the cage. An elevated seat or platform 21 in the form of an elongated board is secured to the cage structure and extends horizontally therewithin to provide a comfortable support upon which the animal may rest. A litter tray 22 is slidably received beneath the barred bottom wall 5 for sanitary purposes.

A restraining wall 23 is contained within the cage 1 and is generally equal in size to the front end wall 6. The restraining wall 23 has parallel side edges 24 and 25 respectively located adjacent the inside surfaces of the side walls 2 and 3 and upper and lower edges 26 and 27 respectively located adjacent the inside surfaces of the top wall 4 and bottom wall 5. The side walls 2 and 3, in this example, are separated into upper and lower sections 28 and 29 forming respective horizontally extending parallel elongated slots 30 and 31 therebetween on opposite sides of the cage. The slots 30 and 31 are bounded at the upper sides thereof by the lower leg of a horizontally extending channel 32 and on the channel 33 of greater vertical height than the channel 32. Brackets 34 and 35 are rigidly secured to the respective side edges 24 and 25 of the restraining wall 23 and each has a leg 36 of substantial horizontal length which is slidably received in the respective slots 32 and 33. The cooperation between the brackets 34 and 35 and the slots 30 and 31 provides sliding support for the restraining wall 23 whereby the wall may be moved toward and away from the front end wall 6 while remaining parallel thereto. A synthetic resin shoe 26' on the legs 36 reduces sliding friction.

The mechanism for moving the restraining wall 23 comprises a pair of front sprockets 37 and 38 independently rotatably mounted at the front ends of the lower channels 33 on the exterior and between the legs thereof. A pair of rear sprockets 39 and 40 are respectively rotatably mounted on the lower channels 33 at the rear ends thereof and are respectively horizontally and laterally aligned with the front sprockets 37 and 38. The rear sprockets 39 and 40 are mounted by means of a rigid shaft 41 fixed at opposite ends respectively thereto whereupon the latter sprockets are free to rotate but must rotate in unison. Parallel endless chains 42 and 43 are respectively engaged with the aligned sets of front and rear sprockets on each side of the cage, the chains being somewhat recessed behind the outwardly extending legs of the lower channels 33.

The legs 36 of the respective brackets 34 and 35 are secured by means of anchor pins 44 to the respective upper strings 45 of the endless chains 42 and 43. Thus, the motion of any one of the sprockets produces a simultaneous and corresponding motion of the remaining sprockets. This causes the brackets 34 and 35 to be moved along the slots 30 and 31 simultaneously resulting in the restraining wall 23 remaining parallel to the front end wall 6 during any movement within the cage. Further, tilting of the restraining wall is prevented by restriction against the legs 36 afforded by the narrowness of the slots 30 and 31.

In this example the front sprocket 37 has a suitable tool socket associated therewith and engaged with a ratchet socket wrench 46. The arcuate reciprocation of the wrench 46, after selecting the desired direction of rotation by the control finger 46', causes controlled rotation of the sprocket 37. The location of the socket at the front of the cage allows a clear view by the operator of the contained animal during movement of the restraining wall 23.

The restraining wall 23 has a horizontally elongated slot 47 extending therethrough for telescopically receiving the platform 21 and thus the platform need not be disturbed during movement of the wall.

A ratchet lock mechanism 48 is provided on at least one of the channels 33 and includes a rocker arm 49 having downwardly projecting teeth 50 and 51. A spring 52 is engaged with a pivot arm 53 which is in turn adapted to engage with the ratchet arm 49 to urge either the tooth 51 or tooth 52 downwardly into engagement with the lower string 54 of the chain depending upon whether the pivot arm 53 is moved in the position illustrated in solid lines or, in the alternative, the position shown by the broken lines 55. In the position shown by the solid lines, the tooth 51 engages the lower string 54 and falls into the spaces between the teeth as the sprocket 37 is moved counterclockwise which causes the restraining wall 23 to move toward the front end wall 6. Any rearward pressure exerted by the animal on the restraining wall does not turn the sprocket 37 in the opposite direction since such force will be positively resisted by the tooth 51 and rocker arm 49. When the pivot arm 53 is moved to the position 55, however, the wall 23 is free to move rearwardly away from the front end wall 6 but is prevented from moving forwardly.

Suitable bearing blocks 56 are adjustably mounted on the respective lower channels 33 for rotatably supporting the opposite ends of the shaft 41 and thereby support the rear sprockets 39 and 40. The bearing blocks 56 are horizontally adjustable with respect to the cage by means of adjusting screws 57 so as to maintain the chains 42 and 43 at desirable tensions.

In operation, the restraining wall 23 is normally maintained as far as possible from the front end wall 6 so as to allow the animal maximum space within the cage for comfort. When it is desired to restrain the animal against the front end wall 6, for example, to inject a hypodermic needle into one of the animals limbs, the pivot arm 53 is moved to the position shown by the solid lines and the socket wrench 46 is adjusted to move the front sprocket 37 counterclockwise as shown in FIG. 1. The arcuate reciprocation of the socket wrench 46 then causes the restraining wall 23 to move toward the front end wall 6, the rocker arm 49 and tooth 51 preventing any rearward movement. The restraining wall 23 is moved forwardly until the animal is squeezed into a substantially immobile condition between the restraining wall and the front end wall 6 whereupon the operator may reach between the bars or pull a limb of the animal through the bars to perform the desired operation. Movement of the pivot arm 53 to the position 55 and reverse cranking of the front sprocket 37 returns the restraining wall 23 to its previous position at the rear of the cage.

A slightly modified form of this invention is illustrated in FIG 2 and is similar to that shown in FIG. 1 except that the legs 36 of the brackets are replaced by a pair of spaced apart rollers 58 which are restrained between a relatively wider slot 59 extending horizontally along the side walls of the cage. The upper string 60 of the chain is secured to the bracket 61 in the same manner as noted above. This form supports the restraining wall on wheels, lowering the resistance to wall adjustment.

A further modified form of this invention is illustrated in FIG. 3 which shows retaining wall supporting structure more suitable for very large and powerful animals. The restraining wall 62 is supported at the four corners thereof, requiring upper and lower chains 63 and 64 respectively on each of the cage side walls. Upper and lower shafts 65 and 66 are rigid with respect to pairs of upper and lower rear sprockets and the shafts 65 and 66 are forced into synchronous movement by means of an endless chain 67 engaged with sprockets 68 and 69 rigidly secured to the respective shafts between the rear side wall sprockets. Thus, the rotation of any sprocket, for example, a front upper sprocket 70 is reflected in the simultaneous movement of all sprockets and the simultaneous movement of each corner of the restraining wall 62 which are respectively anchored by suitable brackets, described below, to the respective chains 63 and 64. Ratchet lock mechanism 71 is provided on at least one of the side chains. The mechanism 71 (FIG. 5), in this example, is somewhat modified over that of FIG. 4 and comprises a pair of downwardly and outwardly projecting, mirror image, spaced apart fingers 72 and 73 pivotally mounted at upper ends respectively thereof to a support plate 74. The fingers 72 and 73 are urged further downwardly and toward each other by a horizontal helical tension spring 75 pivotally anchored at opposite ends respectively thereto. Lower ends 76 and 77 of the fingers 72 and 73 extend below the spring 75 and normally are engaged with the lower string of the chain 63. A control shaft 78 is pivotally mounted between the fingers 72 and 73 and has a projection 79 extending radially therefrom. The projection 79 selectively engages either of the fingers 72 and 73 or is positioned in non-contacting relation therebetween depending upon the rotational position of the shaft 78. A suitable knob 79 (FIG. 3) permits rotation of the shaft 78 as desired. A stop 80 supports the projection 79 in position engaging either of the fingers 72 and 73 whereupon the finger engaged is maintained out of contact with the chain 63 as indicated by the broken lines 72', 79'. When the finger 72 is engaged with the chain, the chain is free to move in the direction indicated by the arrow 81 but restrained against movement in the opposite direction. The lifting of the finger 72 and engagement with the chain of finger 73 produces the opposite result. A center position of the projection 79 locks the chain from movement in either direction.

The entire weight of the restraining wall 62 is, in this example, supported by corner brackets 82 and 83 located at the upper corners and sliding along suitable elongated slots as described with respect to FIG. 1. The lower corners of the restraining walls 62 are merely prevented from moving out of desired alignment by means of brackets 84 which are anchored to the upper string of the lower side chains. The operation of the embodiment of FIG. 3 is otherwise similar to that of FIG. 1, using a ratchet wrench 85.

With large equipment, and particularly when female operators are involved, the use of a ratchet wrench may be difficult or excessively tiring. To alleviate this situation, a modified form of chain drive is provided as shown in FIGS. 6 and 7. In this form a worm gear 86 is fixed to the drive shaft of the sprocket 70 and is in continuous engagement with a worm 87. The worm 87 is fixed to one end of a shaft 88 rotatably mounted in suitable bearing structure 89. The other end of the shaft 88 supports a socket 90 adapted to receive a wrench block 91 fixed to the output shaft of a reversible power tool 92. The power tool 92, in this example, is electrically driven through a suitable electrical cord 93 and controlled with a trigger 94 and shaft direction selector 95. The tool 92 includes a slip clutch 93 preventing excessive torque application to the worm gear 86 which would possibly harm the caged animal. The tool 92 rests in a suitable bracket 96 which permits easy removal thereof for cage cleaning and/or use alternately with several cages having like drive structure.

In operation, the tool 92 is placed in the bracket 96 and the wrench block 91 simultaneously engaged with the socket 90. The shaft direction selector is adjusted to produce the desired direction of rotation and the trigger 94 actuated to effect the rotation and thereby move the restraining wall.

Figure 4:
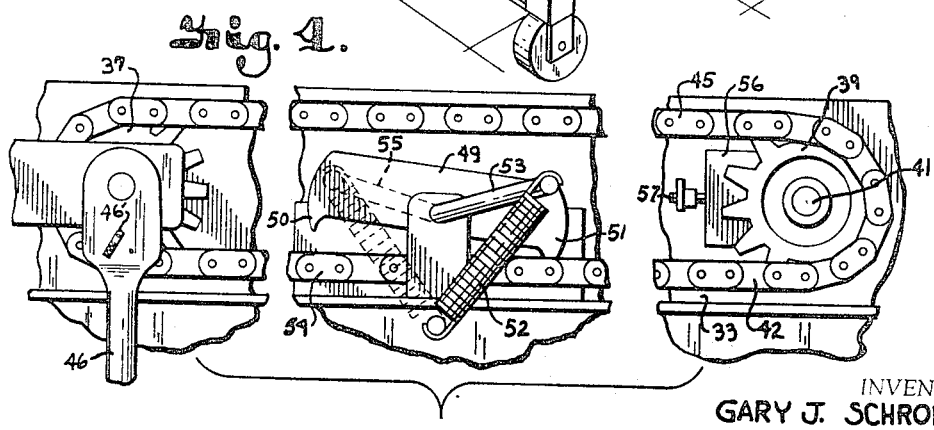
FIG. 4 is a fragmentary side elevation on an enlarged scale showing a ratchet mechanism for automatically locking the restraining wall in a desired position.

The pitch angle of the worm 87 may be selected sufficiently high to render it self locking against induced rotation from torque applied to the worm gear 86, in which case the combination of worm and worm gear replaces the lock mechanisms of FIGS. 4 and 5.

It is to be understood that although certain forms of this invention have been illustrated and described, it is not to be limited thereto except insofar as such limitations are included in the following claims.

What I claim and desire to secure by Letters Patent is:
1. An animal restraining cage having a pair of spaced apart walls and a front end wall;
   (a) a restraining wall receivable in said cage, means mounting said restraining wall in said cage in a predetermined relation with said end wall and for movement toward and away from said end wall, said means including,
   (b) a front sprocket rotatably mounted on said cage adjacent each of said spaced apart walls, a rear sprocket rotatably mounted on said cage adjacent each of said spaced apart walls and spaced rearwardly of said front sprockets, a pair of parallel endless chains adjacent each of said spaced apart walls and respectively engaged with one of said front sprockets and one of said rear sprockets,
   (c) said restraining wall having a pair of brackets mounted thereon and extending therefrom, said brackets being respectively secured to corresponding positions on said chains, means synchronizing the rotation between a pair of sprockets not joined by one of said chains, and means for selectively rotating one of said sprockets, whereby a corresponding movement in both of said chains is produced causing said restraining wall to be moved while maintaining said predetermined relation with said end wall.

2. The apparatus as set forth in claim 1 wherein:
   (a) said spaced apart walls are parallel side walls.
3. The apparatus as set forth in claim 2 wherein:
   (a) said side walls have vertically spaced apart upper and lower portions forming horizontal slots for receiving and guiding said brackets.
4. The apparatus as set forth in claim 3 wherein:
   (a) said brackets are slidable on said lower portions in said slots for movably supporting said restraining wall.
5. The apparatus as set forth in claim 3 including:
   (a) a pair of spaced apart wheels on each of said brackets and in rolling contact with at least one of said portions on each side wall of said cage.
6. The apparatus as set forth in claim 1 including:
   (a) second front and rear sprockets rotatably mounted on said cage adjacent each of said spaced apart walls and spaced from said first named sprockets,
   (b) a second pair of parallel endless chains engaged with said second sprockets and parallel to said first named chains,
   (c) a second pair of brackets mounted on said restraining wall and secured to corresponding positions on said second chains, and
   (d) means synchronizing the rotation between said first named and second sprockets.
7. The apparatus as set forth in claim 1 wherein:
   (a) said synchronizing means comprises a shaft extending between and secured to said rear sprockets.
8. The apparatus as set forth in claim 6 wherein:
   (a) said first named synchronizing means comprises a pair of shafts extending between and secured respectively to corresponding pairs of said first and second rear sprockets, and
   (b) said last named synchronizing means comprises a sprocket rotatably fixed to each of said last named shafts and an endless chain engaged with said last named sprockets.
9. The apparatus as set forth in claim 1 including:
   (a) locking means mounted on said cage and operably associated with at least one of said chains to prevent movement of said restraining wall away from said end wall.
10. The apparatus as set forth in claim 9 wherein:
    (a) said locking means includes a pair of projecting members selectively engageable with said last named chain, one of said projecting members being adapted to prevent movement of said restraining wall away from said end wall, the other of said projecting members being adapted to prevent movement of said restraining wall toward said end wall.
11. The apparatus as set forth in claim 10 including:
    (a) a rocker arm,
    (b) said projecting members comprising spaced apart teeth on said rocker arm.
12. The apparatus as set forth in claim 10 wherein:
    (a) said projecting members comprise movably mounted fingers independently engageable with said last named chain.
13. The apparatus as set forth in claim 1 including:
    (a) a platform mounted in said cage and extending along one of said spaced apart walls at right angles to said restraining wall, and
    (b) a slot in said restraining wall and telescopically receiving said platform.
14. The apparatus as set forth in claim 1 wherein:
    (a) said means for selectively rotating one of said sprockets comprises a ratchet wrench.
15. The apparatus as set forth in claim 1 wherein:
    (a) said means for selectively rotating one of said sprockets comprises a worm gear rotatably fixed with respect to said last named sprocket, a worm rotatably mounted on said cage and engaging said worm gear, and
    (b) means for selectively rotating said worm.

16. The apparatus as set forth in claim 15 wherein:
(a) said means for selectively rotating said worm comprises a power tool operably engageable with said worm, and
(b) means on said cage adapted to removably support said power tool in operable position.

References Cited

UNITED STATES PATENTS

| 286,575 | 10/1883 | Barnes | 119—82 |
| 1,436,897 | 11/1922 | Novak | 119—99 |

HUGH R. CHAMBLEE, *Primary Examiner.*